Feb. 24, 1959         A. G. MENTES         2,874,620

SPREADER WITH AGGREGATE DESEGREGATING MEANS

Filed July 11, 1956

INVENTOR.
ALEXANDER G. MENTES

BY

*Clark & Ott*

ATTORNEYS

United States Patent Office 2,874,620
Patented Feb. 24, 1959

2,874,620

SPREADER WITH AGGREGATE DESEGREGATING MEANS

Alexander G. Mentes, Hasbrouck Heights, N. J.

Application July 11, 1956, Serial No. 597,191

2 Claims. (Cl. 94—44)

This invention relates to spreaders for spreading loose aggregate as a base for roadways, parking lots, aircraft runways and the like and the invention has particular reference to an improved spreader which is constructed and arranged to produce a remixing of the aggregate with the forward movement of the spreader.

In this art the aggregate is sized to provide gradation of the particles to thereby obtain maximum mechanical particle interlocking and stability. Every time the aggregate is handled or is moved no matter how slight the movement there is a tendency of the heavier aggregate to gravitate towards the bottom. Thus, during the loading of the truck, the rolling movement of the truck carrying the aggregate to the spreader, the discharge of the aggregate from the truck into the spreader and during the movement of the spreader the large particles of aggregate separate from the smaller particles and gravitate towards the bottom. Furthermore, the aggregate is dumped into the truck and from the truck into the spreader in the form of a cone shaped heap with a consequent rolling of the larger particles down the sides of the heap. This tends to desegregate the desired mixture of the aggregate.

In order to overcome this objection, the invention provides means whereby the aggregate is remixed with the forward movement of the spreader.

Another object of the invention is to provide a spreader which is so constructed and arranged as to utilize the displacement of the aggregate caused by the forward movement of the spreader to rearrange the segregated aggregate within the spreader to more nearly approximate its original desegregated condition.

Another object of the invention is to provide baffles so arranged within the spreader as to effect a remixinng of the aggregate therein with the forward movement of the spreader.

The invention includes a container having an open bottom, a strike-off means at the rear and a plurality of diagonally extending stepped baffles arranged at each side within the container. In operation the aggregate is dumped from a truck into the container and onto the base beneath the container. The spreader is pushed forwardly as by a tractor which forward movement pushes the aggregate within the container forwardly with the exception of a layer thereof spread on the base and discharged beneath the strike-off means. Due to the repeated handling and transportation of the aggregate, the aggregate is segregated with the larger particles thereof tending to concentrate outwardly. The forward movement of the spreader pushes the baffles into the heap of aggregate within the container to effect a remixing thereof so as to more nearly approximate its original desegregated condition.

With the foregoing and other objects in view, reference is now made to the following specification and accompanying drawings in which the preferred embodiment of the invention is illustrated.

Figure 1:
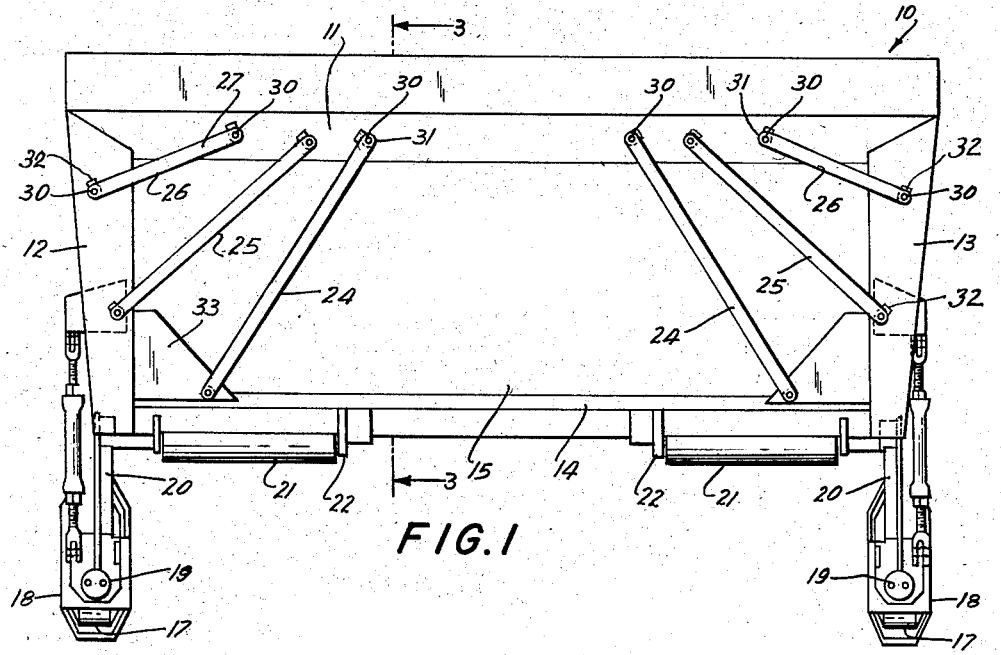
Fig. 1 is a top plan view of a spreader constructed in accordance with the invention.
Figure 2:
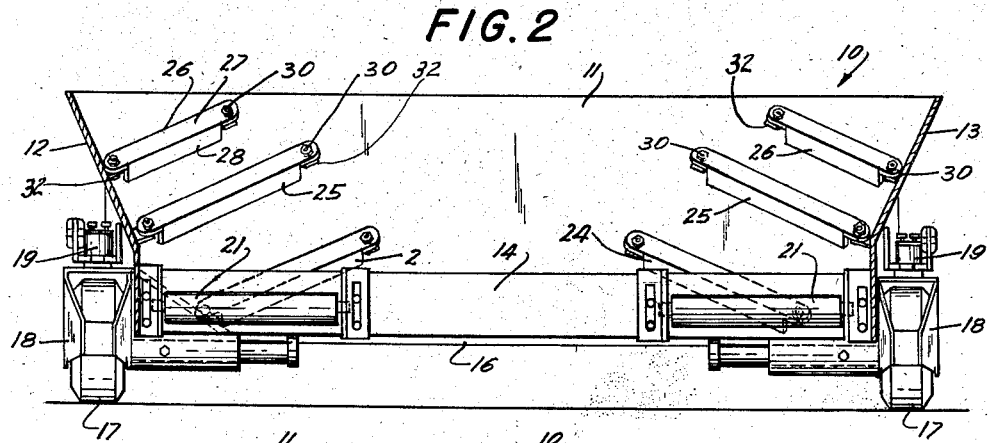
Fig. 2 is a view in front elevation thereof.
Figure 3:
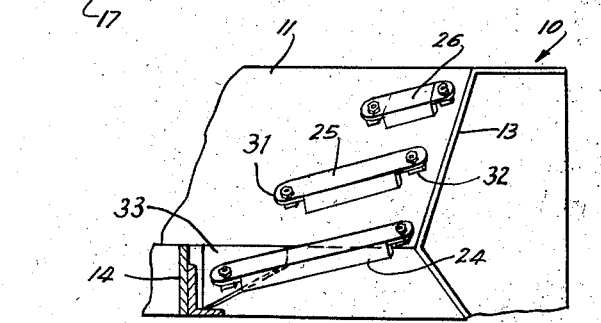
Fig. 3 is a fragmentary vertical sectional view taken approximately on line 3—3 of Fig. 1.

Referring to the drawings, the spreader includes a container 10 having a rear wall 11, opposite side walls 12 and 13, a forward wall 14 and an open bottom 15. As illustrated, the upper portion of the container is of hopper shaped formation, the upper portion of the rear wall 11 and the upper portions of the opposite side walls 12 and 13 flaring outwardly. The rear wall 11 is provided with a strike-off blade 16 which is adjustable in an upwardly extending plane to permit of the discharge of the desired depth of aggregate therebelow with the forward movement of the spreader. The spreader is rollably supported at its forward end on wheels 17 which are mounted on shafts journalled in housings 18. The housings are journalled for turning movement in bearings 19 carried by arms 20 operatively connected with the container 10 to extend forwardly thereof. Between the wheels 17 the container is provided with rollers 21 rollably mounted on brackets 22 affixed to and extending forwardly of the front wall. The rollers 21 constitute bumpers adapted to be engaged by the wheels of a truck when dumping aggregate into the container 10. The spreader is moved forwardly over the base on which the aggregate is to be spread by means such as a tractor positioned against the rear wall 11 of the container and which in the forward movement of the spreader travels upon the aggregate discharged beneath the strike-off means of the spreader.

In order to remix the aggregate in the container 10 as the spreader is moved, a plurality of diagonally disposed baffles 24, 25 and 26 are provided which are arranged within the container at each side thereof in stepped formation and in forwardly diverging relation from the rear wall 11. The baffles are of bent formation in cross-sectional configuration with the upper and lower portions 27 and 28 thereof being directed angularly toward one side of the container. The baffles are secured in position by bolts 30 extending through apertured lugs 31 and 32 carried respectively by the baffles and the container. As illustrated, the baffles 24 are secured to the rear wall 11 and to inwardly sloping plates 33 welded or otherwise secured at their outer edges to the side walls 12 and 13 respectively and at their inner ends to the front wall 14. The baffles 25 are located rearwardly of and above the baffles 24 respectively and are secured to the rear wall 11 and to the side walls 12 and 13 respectively, while the baffles 26 are located rearwardly of and above the baffles 25 respectively and are secured to the rear wall 11 and to the side walls 12 and 13 respectively. The baffles on each side extend angularly downward from the rear wall and diverge outwardly toward their forward ends.

With each truck load of aggregate dumped into the container, the baffles 24 are pushed into the heap thereof toward the bottom with the forward movement of the spreader to thereby remix the larger particles of aggregate at the sides of the heap with the smaller particles as the same are tumbled to the rear of said baffles. The baffles 25 and 26 similarly push into the heap toward the top thereof producing a further remixing of the larger particles with the smaller particles at the top of the heap.

What is claimed is:

1. In a spreader of the character described, a rollably supported container having side walls and an open bottom and open top, said side walls including a rear wall and opposite side walls connected with the rear wall to form oppositely disposed rear corners, a plurality of baffles at each side secured to said container in fixed relation in front of a rear corner, and said baffles at each side being disposed at different elevations respectively and being of successively increasing length from top to bottom and extending outwardly and downwardly from the rear wall to each of the side walls between points which are increasingly spaced from the corresponding corner for baffles of increasing length.

2. In a spreader of the character described, a rollably supported container having side walls and an open bottom and open top, said side walls including a rear wall and opposite side walls connected with the rear wall to form oppositely disposed rear corners, a plurality of baffles at each side secured to said container in fixed relation in front of a rear corner, and said baffles at each side being disposed at different elevations respectively and being of successively increasing length from top to bottom and extending outwardly from the rear wall to each of the side walls between points which are increasingly spaced from the corresponding corner for baffles of increasing length.

References Cited in the file of this patent
UNITED STATES PATENTS

| | | |
|---|---|---|
| 1,745,716 | Rydners | Feb. 4, 1930 |
| 2,176,534 | Loos | Oct. 17, 1939 |
| 2,186,081 | Slavin | Jan. 9, 1940 |
| 2,274,225 | White | Feb. 24, 1942 |
| 2,479,800 | Williams | Aug. 23, 1949 |
| 2,586,396 | Trampler | Feb. 19, 1952 |